US012401956B2

(12) United States Patent
Jensen et al.

(10) Patent No.: US 12,401,956 B2
(45) Date of Patent: Aug. 26, 2025

(54) HEARING DEVICE WITH A SUSPENDED MICROPHONE

(71) Applicant: GN Hearing A/S, Ballerup (DK)

(72) Inventors: Jakob Søndergaard Jensen, Havdrup (DK); Yu Luan, Kongens Lyngby (DK)

(73) Assignee: GN HEARING A/S, Ballerup (DK)

( * ) Notice: Subject to any disclaimer, the term of this patent is extended or adjusted under 35 U.S.C. 154(b) by 274 days.

(21) Appl. No.: 18/136,295

(22) Filed: Apr. 18, 2023

(65) Prior Publication Data

US 2023/0353961 A1 Nov. 2, 2023

(30) Foreign Application Priority Data

Apr. 27, 2022 (DK) ........................... PA 2022 70224

(51) Int. Cl.
*H04R 25/00* (2006.01)

(52) U.S. Cl.
CPC ......... *H04R 25/604* (2013.01); *H04R 25/505* (2013.01); *H04R 25/609* (2019.05); *H04R 25/65* (2013.01)

(58) Field of Classification Search
CPC .. H04R 25/604; H04R 25/505; H04R 25/609; H04R 25/65; H04R 1/08; H04R 1/222; H04R 25/456; H04R 1/1075
See application file for complete search history.

(56) References Cited

U.S. PATENT DOCUMENTS

| | | | |
|---|---|---|---|
| 4,440,982 A | 4/1984 | Kaanders et al. |
| 4,447,677 A | 5/1984 | Miyahra et al. |
| 2006/0153411 A1 | 7/2006 | Mehr |
| 2010/0208927 A1 | 8/2010 | Ritter et al. |
| 2020/0314563 A1 | 10/2020 | Friis et al. |

FOREIGN PATENT DOCUMENTS

| | | | |
|---|---|---|---|
| GB | 790468 A | 2/1958 |
| WO | WO 2005/048646 A2 | 5/2005 |
| WO | WO 2009/137360 A1 | 11/2009 |
| WO | WO 85/03185 | 7/2015 |
| WO | WO 2017/167395 A1 | 10/2017 |

OTHER PUBLICATIONS

Foreign Technical Examination for Danish Patent Appln. No. PA 2022 70224 dated Jul. 14, 2022.
Extended European Search Report for EP Patent Appln. No. 23170481.8 dated Sep. 22, 2023.

*Primary Examiner* — Tuan D Nguyen
(74) *Attorney, Agent, or Firm* — Vista IP Law Group, LLP

(57) ABSTRACT

A hearing device includes a microphone device for provision of a microphone input signal, the microphone device comprising a membrane. The hearing device comprising a processor for processing the microphone input signal and providing an electrical output signal based on the microphone input signal. The hearing device comprising a receiver for converting the electrical output signal to an audio output signal. The hearing device comprising a printed circuit board. The hearing device comprising one or more housings, wherein the microphone device is arranged in a first housing of the one or more housings. The hearing device comprising a suspension element for suspending the microphone device in the first housing. The suspension element may have a first end connected to the first housing and a second end connected to the microphone device. The suspension element and the microphone device may have a fundamental resonance frequency in the range of 0.5-5 kHz.

25 Claims, 5 Drawing Sheets

HEARING DEVICE WITH A SUSPENDED MICROPHONE

RELATED APPLICATION DATA

This application claims priority to, and the benefit of, Danish Patent Application No. PA 2022 70224 filed on Apr. 27, 2022. The entire disclosure of the above application is expressly incorporated by reference herein.

FIELD

The present disclosure relates to a hearing device comprising a suspended microphone device.

BACKGROUND

Earpieces are used in a large variety of situations, where an audio signal is presented to the user via the earpiece. Further, earpieces are used in communication systems for presenting to and/or receiving audio signals from the user.

In two-part hearing devices with an earpiece and an external device, such as a BTE-device, the earpiece is connected to the external device by a cable comprising one or more wires and/or a sound guiding channel.

Hearing devices are typically worn for many hours and therefore sound quality is of key importance for a hearing device user.

SUMMARY

There is a need for hearing devices and methods with improved sound quality.

A hearing device is disclosed, the hearing device comprising a microphone device for provision of a microphone input signal, the microphone device comprising a membrane. The hearing device comprises a processor for processing the microphone input signal and providing an electrical output signal based on the microphone input signal. The hearing device comprises a receiver for converting the electrical output signal to an audio output signal. The hearing device comprises a printed circuit board; one or more housings, wherein the microphone device is arranged in a first housing of the one or more housings; and a suspension element for suspending the microphone device in the first housing. The suspension element may have a first end connected to the first housing and a second end connected to the microphone device. The suspension element and the microphone device may have a fundamental resonance frequency in the range of 0.5-5 kHz.

It is an important advantage of the hearing device that the hearing device can reduce a feedback signal transferred from the hearing aid's housing vibrations to the microphone in turn allowing for improved sound pickup or detection by the microphone. By suspending the microphone device in the housing, e.g. such that the suspension element and the microphone device have a fundamental resonance frequency in the range of 0.5-5 kHz, the phase of a vibrational feedback signal from the housing of the hearing device can be reversed. Reversing the phase of the vibrational feedback signal introduces a cancelation to an acoustic feedback signal that is radiated by the hearing aid housing's surfaces and picked up by the microphones without a corresponding phase change. Furthermore, the suspension element introduces an attenuation of the vibrational feedback corresponding to for example 6 dB/octave above the fundamental resonance frequency. Thereby, the vibration feedback can be attenuated at high frequencies. The suspension element further provides or allows for an easy seal of the microphone compared to traditional sealing, such as using compressed foam.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
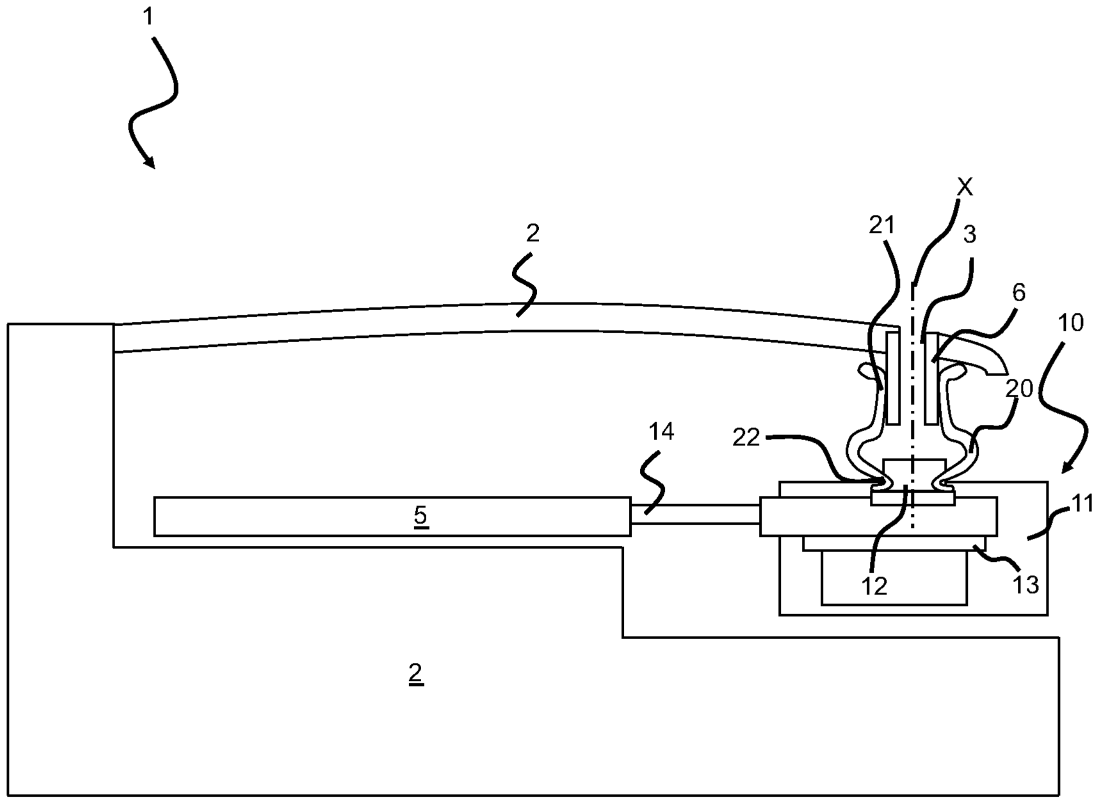
FIG. 1 schematically illustrates an example hearing device having a suspended microphone device according to the disclosure, FIG. 2 schematically illustrates an example suspension element according to the disclosure, FIG. 3 schematically illustrates example electrical connectors for connecting the microphone device to a circuit board according to the disclosure, FIG. 4 schematically illustrates example connectors for connecting the suspension element to the microphone device and a housing of the hearing device according to the disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

In a hearing device, feedback signals may be created by vibrations of a housing of the hearing aid and may be transferred to the microphone. This may compromise stability of the hearing aid. The feedback signals may comprise acoustical feedback and mechanical, such as vibrational feedback. The acoustical feedback may be caused by sound emitted from the hearing device's speaker into the ear leaking out of the ear and finding its way to the hearing device's microphone. That leaked sound may be picked up by the microphone and may be re-amplified. The mechanical feedback may occur because the amplified sound from the hearing device creates physical vibrations in the hearing device housing which may be picked up at the microphone of the hearing device and may pass through the hearing device and be reamplified again. If the amplification is large enough, the signal passing through the feedback loop will become louder and louder, eventually resulting in the high-frequent whistling sound causing discomfort for the hearing device user. Reducing the feedback signal transferred from vibrations of the housing of the hearing device to the microphone is a significant challenge.

The current disclosure proposes a soft suspension concept for hearing device microphones to introduce a low-frequency fundamental resonance (such as <1 kHz) of the suspended microphone system, such as of the system comprising the microphone and a suspension element. The purpose of the suspension-induced resonance is two-fold. Firstly, a phase-cancelation between the acoustic and the mechanical, such as vibrational, feedback signals can be achieved, leading to a reduced overall feedback signal. Secondly, a general reduction of the vibrational feedback signal can be achieved.

By suspending the microphone, for frequencies above the suspension-induced fundamental resonance frequency and below the higher order resonances, the phase of the vibrational feedback signal can be reversed. The reversed vibrational feedback signal can introduce a cancelation to the acoustic feedback signal that is radiated by the hearing device's surfaces and picked up by the microphone of the hearing device without a corresponding phase change which can reduce the overall feedback signal.

The suspension of the microphone can also introduce an attenuation of the vibrational feedback corresponding to 6 dB/octave above the fundamental natural frequency. Thereby, the vibration feedback can be attenuated at higher frequencies.

A hearing device is disclosed. The hearing device may be configured to be worn at an ear of a user and may be a hearable or a hearing aid, wherein the processor is configured to compensate for a hearing loss of a user.

The hearing device may be of the behind-the-ear (BTE) type, in-the-ear (ITE) type, in-the-canal (ITC) type, receiver-in-canal (RIC) type or receiver-in-the-ear (RITE) type, and/or microphone-and-receiver-in-ear (MaRie) type. The hearing aid may be a binaural hearing aid. The hearing device may comprise a first earpiece and a second earpiece, wherein the first earpiece and/or the second earpiece is an earpiece as disclosed herein.

The hearing device may be configured for wireless communication with one or more devices, such as with another hearing device, e.g. as part of a binaural hearing system, and/or with one or more accessory devices, such as a smartphone and/or a smart watch. The hearing device optionally comprises an antenna for converting one or more wireless input signals, e.g. a first wireless input signal and/or a second wireless input signal, to antenna output signal(s). The wireless input signal(s) may origin from external source(s), such as spouse microphone device(s), wireless TV audio transmitter, and/or a distributed microphone array associated with a wireless transmitter. The wireless input signal(s) may origin from another hearing device, e.g. as part of a binaural hearing system, and/or from one or more accessory devices.

The hearing device optionally comprises a radio transceiver coupled to the antenna for converting the antenna output signal to a transceiver input signal. Wireless signals from different external sources may be multiplexed in the radio transceiver to a transceiver input signal or provided as separate transceiver input signals on separate transceiver output terminals of the radio transceiver. The hearing device may comprise a plurality of antennas and/or an antenna may be configured to be operate in one or a plurality of antenna modes. The transceiver input signal optionally comprises a first transceiver input signal representative of the first wireless signal from a first external source.

The hearing device comprises a microphone device, such as a set of microphones. The set of microphones may comprise one or more microphones. The set of microphones comprises a first microphone for provision of a first microphone input signal and/or a second microphone for provision of a second microphone input signal. The set of microphones may comprise N microphones for provision of N microphone signals, wherein N is an integer in the range from 1 to 10. In one or more exemplary hearing devices, the number N of microphones is two, three, four, five or more. The set of microphones may comprise a third microphone for provision of a third microphone input signal.

The hearing device optionally comprises a pre-processing unit. The pre-processing unit may be connected to the radio transceiver for pre-processing the transceiver input signal. The pre-processing unit may be connected the first microphone for pre-processing the first microphone input signal. The pre-processing unit may be connected the second microphone if present for pre-processing the second microphone input signal. The pre-processing unit may comprise one or more A/D-converters for converting analog microphone input signal(s) to digital pre-processed microphone input signal(s).

The hearing device comprises a processor for processing input signals, such as pre-processed transceiver input signal and/or pre-processed microphone input signal(s). The processor provides an electrical output signal based on the input signals to the processor. Input terminal(s) of the processor are optionally connected to respective output terminals of the pre-processing unit. For example, a transceiver input terminal of the processor may be connected to a transceiver output terminal of the pre-processing unit. One or more microphone input terminals of the processor may be connected to respective one or more microphone output terminals of the pre-processing unit.

The hearing device comprises a processor for processing input signals, such as pre-processed transceiver input signal(s) and/or pre-processed microphone input signal(s). The processor is optionally configured to compensate for hearing loss of a user of the hearing device. The processor provides an electrical output signal based on the input signals to the processor. Input terminal(s) of the processor are optionally connected to respective output terminals of the pre-processing unit. For example, a transceiver input terminal of the processor may be connected to a transceiver output terminal of the pre-processing unit. One or more microphone input terminals of the processor may be connected to respective one or more microphone output terminals of the pre-processing unit.

It is noted that descriptions and features of hearing device functionality, such as hearing device configured to, also apply to methods and vice versa. For example, a description of a hearing device configured to determine also applies to a method, for example of operating a hearing device, wherein the method comprises determining and vice versa.

The hearing device may comprise a receiver for converting the electrical output signal, such as the electrical output signal provided by the processor, to an audio output signal.

The hearing device may comprise a circuit board, such as a printed circuit board (PCB). The circuit board may be configured to mechanically support and electrically connect one or more components or electrical components using for example conductive tracks or pads. The circuit board may comprise one or more sheet layers of a conductive layer, laminate, or film, such as of copper, that may be laminated onto and/or between sheet layers of a non-conductive substrate.

The hearing device comprises one or more housings, such as for housing one or more of the microphone device, the receiver, the circuit board, and the processor. The microphone device may be arranged in a first housing of the one or more housings. The first housing may be an external housing configured to be arranged in or around the ear of a user. In one or more example hearing devices, the first housing is a non-implanted housing.

The hearing device comprises a suspension element for suspending the microphone device in the first housing. The suspension element may be configured to allow the microphone device to move in relation to the housing, such as to the first housing, of the hearing device. Thereby, the microphone device may move out-of-phase with the housing of the microphone device. The suspension element having a first end connected to the first housing and a second end connected to the microphone device. In one or more example hearing devices, the suspension element and the microphone, such as a mass-spring system comprising and/or consisting of the suspension element and the microphone device, is configured to have a fundamental resonance frequency in a range, such as a frequency range, required to cancel out the acoustic feedback signal of the hearing device, such as of the housing of the hearing device. In one or more example hearing devices, the suspension element and the microphone, such as the mass-spring system comprising and/or consisting of the suspension element and the microphone device, has a fundamental resonance frequency in the range of 0.5-10 kHz, such as 0.5-5 kHz. In one or more example hearing devices, the suspension element and the microphone may have a fundamental resonance frequency in the range of 0.5-1.8 kHz. In one or more example hearing devices, the suspension element and the microphone has a fundamental resonance frequency in the range of 4.5-7 kHz. In one or more example hearing devices, the suspension element and the microphone has a fundamental resonance frequency in the range of 8-10 kHz.

The microphone voltage output V may comprise a contribution from two feedback signals, such as acoustic feedback signals and vibrational feedback signals according to equation 1 below:

$$V=p\eta_{aco}+a\eta_{vib}, \quad \text{(Equation 1)}$$

where p is a feedback sound pressure, a is a vibration acceleration of the microphone device, $\eta_{aco}$ is an acoustic sensitivity of the microphone device, and $\eta_{vib}$ is a vibration sensitivity of the microphone device, respectively. The phase between sound and vibration signals may be the same up to the fundamental resonance frequency of the microphone device and the suspension element. Hence, when the two signals are in phase they may add up.

According to the current disclosure, the microphone vibration can be adjusted by suspending the microphone with a suspension element, such as a soft suspending part.

Above the fundamental resonance frequency induced by the suspension element and below the higher order resonances, the phase of the vibrational feedback signal is reversed. Thereby, a cancelation to the acoustic feedback signal that is radiated by the surfaces of the housing of the hearing device and picked up by the microphone without a corresponding phase change can be achieved. In other words, when the phase of the vibrational feedback signal is reversed the vibration part of equation 1, namely $a\eta_{vib}$, becomes negative and cancels out, or at least partly cancels out, the acoustic part of the feedback signal, namely $p\eta_{aco}$. Thereby, the feedback signal received by the microphone can be reduced.

In one or more example hearing devices, the hearing device comprising a microphone device for provision of a microphone input signal, the microphone device comprising a membrane. The hearing device comprises a processor for processing the microphone input signal and providing an electrical output signal based on the microphone input signal. The hearing device comprises a receiver for converting the electrical output signal to an audio output signal. The hearing device comprises a printed circuit board; one or more housings, wherein the microphone device is arranged in a first housing of the one or more housings; and a suspension element for suspending the microphone device in the first housing. The suspension element may have a first end connected to the first housing and a second end connected to the microphone device. The suspension element and the microphone device has a fundamental resonance frequency in the range of 0.5-5 kHz.

In one or more example hearing devices, the suspension element forms a cavity having a first inner diameter at the first end, a second inner diameter at the second end and an intermediate inner diameter between the first inner diameter and the second inner diameter. The intermediate inner diameter may be larger than the first inner diameter. In one or more example hearing devices the intermediate inner diameter may be in the range of 1.1-1.4 times the first inner diameter, such as 1.2 times the first inner diameter.

The intermediate inner diameter may be larger than the second inner diameter. In one or more example hearing devices the intermediate inner diameter may be in the range of 1.1-1.4 times the second inner diameter, such as 1.2 times the second inner diameter. The suspension element may thus have a tapered shape towards the first end. The first inner diameter may be equal to or different from the second inner diameter. In one or more example methods, the first inner diameter is equal to the second inner diameter and the intermediate inner diameter is larger than both the first and the second inner diameter.

In one or more example hearing devices, the suspension element comprises a first part extending from the first end of the suspension element to an intermediate section of the suspension element, wherein the first part has a continuously increasing inner diameter towards the intermediate section of the suspension element. In one or more example methods, the first part has a continuously increasing outer diameter towards the intermediate section of the suspension element. The suspension element, such as an inner surface of the first part and/or an outer surface of the first part, may thus have a tapered shape towards the first end.

In one or more example hearing devices, the suspension element comprises a second part extending from the second end of the suspension element to an intermediate section of the suspension element, wherein the second part has a continuously increasing outer diameter towards the intermediate section of the suspension element. In one or more example methods, the second part has a continuously increasing outer diameter towards the intermediate section of the suspension element. The suspension element, such as an inner surface of the second part and/or an outer surface of the second part, may thus have a tapered shape towards the second end. In one or more example hearing devices, the suspension element may have a double cone shape, such as the inner surface of the first part and/or the outer surface of the first part being tapered towards the first end and the inner surface of the second part and/or the outer surface of the second part being tapered towards the second end.

In one or more example hearing devices, the suspension element has a constant wall thickness between the first end and the second end. In other words, both the inside and the outside of the first part may be tapered towards the first end, and/or both the inside and the outside of the second part may be tapered towards the second end.

In one or more example hearing devices, the suspension element is made of a resilient material, such as rubber. The resilient suspension element may act as a spring, such that the microphone device and the suspension element create a mass-spring system.

In one or more example hearing devices, a Young's modulus of the suspension element is selected so that the mass-springs system comprising the suspension element and the microphone has a fundamental resonance frequency in one or more of the fundamental frequency ranges disclosed herein. In one or more example hearing devices, the Young's modulus of the suspension element is selected to provide a fundamental resonance frequency in a range, such as a frequency range, required to cancel out the acoustic feedback signal of the hearing device, such as of the housing of the hearing device. In one or more example hearing devices, the Young's modulus of the suspension element is selected to provide a fundamental resonance frequency in the range of 0.5-10 kHz, such as 0.5-5 kHz. In one or more example hearing devices, the Young's modulus of the suspension element is selected to provide a fundamental resonance frequency in the range of 0.5-1.8 kHz. In one or more example hearing devices, the Young's modulus of the suspension element is selected to provide a fundamental resonance frequency in the range of 4.5-7 kHz. In one or more example hearing devices, the Young's modulus of the suspension element is selected to provide a fundamental resonance frequency in the range of 8-10 kHz. In one or more example hearing devices, the suspension element has a Young's modulus in the range of 0.001 to 0.1 GigaPascal (GP).

In one or more example hearing devices, a longitudinal axis of the suspension element extends perpendicular to the membrane of the microphone device. The suspension element may be open along the longitudinal axis to allow soundwaves to pass through the suspension element and reach the microphone.

In one or more example hearing devices, the suspension element is connected to the first housing via a first connector and to the microphone device via a second connector. In one or more example methods, the first connector and/or the second connector are ring shaped, such as having a circular or ovaloid cross section. The first connector and/or the second connector may be made of a stiffer material, such as having a higher Young's modulus, than the suspension element. In one or more example hearing devices, the material of the first connector and/or the second connector may have an elastic module (E) in the range of 450-550 MPa, such as 500 MPa, and a density (p) in the range of 1800-2200 $kg/mm^3$, such as 2000 $kg/mm^3$. In one or more example hearing devices, the first connector and/or the second connector have an inner radius in the range of 0.6-1 mm, such as 0.7-0.9 mm, such as 0.8 mm. In one or more example hearing devices, the first connector and/or the second connector have a wall thickness of 0.18-0.22 mm, such as 0.19-0.21 mm, such as 0.2 mm.

In one or more example methods, the second connector is a spout on the microphone device. The spout may extend from an outer surface of the microphone device towards a wall of the first housing. The spout may have a circular or ovaloid cross section, though the particular shape of the spout is not limiting.

In one or more example hearing devices, the microphone device comprises one or more electrical connectors connecting the microphone device to the printed circuit board, wherein the one or more electrical connectors have a higher stiffness in a direction parallel to the membrane of the microphone device than in a direction perpendicular to the membrane of the microphone device. Thereby, the one or more electrical connectors do not prevent the microphone device from moving along a longitudinal axis of the suspension element, while securing the microphone device in one or more directions perpendicular to the longitudinal axis of the suspension element. The one or more electrical connectors may be made of a sheet material, such as of a flat piece of material. A sheet material may herein be seen as a thin, flat layer of material, such as a layer of material having a thickness substantially smaller than a width and a length of the piece of material, such as a thickness in the micrometer (μm) range compared to a width and/or a length in the millimeter (mm). In one or more example hearing devices, the one or more electrical connectors may have a length in the range of 1.8-2.0 mm, such as in the range of 1.9-2.1 mm, such as 2.0 mm. In one or more example hearing devices, the one or more electrical connectors may have a width in the range of 0.25-0.75 mm, such as in the range of 0.4-0.6 mm, such as 0.5 mm. In one or more example hearing devices, the one or more electrical connectors may have a thickness in the range of 40-50 μm, such as in the range of 42-46 μm, such as 44 μm. In one or more example hearing devices, the material of the electrical connector may comprise one or more of polyamid, copper and solder mask. In one or more example hearing devices, the electrical connectors may be made of a composite material, such as of a layered material. The layered material may for example comprise a first layer of polyamid, a second layer of copper and a third layer of solder mask. The first layer may have a first thickness in the range of 10-14 μm, such as 12 μm. The second layer may have a second thickness in the range of 18-20 μm, such as 20 μm. The third layer may have a third thickness in the range of 12-16 μm, such as 14 μm. The properties of the one or more electrical connectors, such as a length, a width and/or a thickness of the one or more electrical connectors may be selected to trim the fundamental resonance frequency of the microphone device and the suspension element to cancel out the acoustic feedback signal.

FIG. 1 shows a view of an exemplary hearing device 1. The hearing device 1 comprises a housing 2, such as a first housing. The hearing device 1 comprises a microphone device 10 for provision of a microphone input signal. The microphone device 10 comprises microphone housing 11, a spout 12 and a membrane 13. The microphone device 10 is arranged in the housing 2. The suspension element 20 may be arranged on the microphone device 10 so that a longitudinal axis X of the suspension element 20 extends in a direction perpendicular to the membrane 13 of the microphone device 10. The hearing device 1 comprises a circuit board 5, such as a PCB. The circuit board 5 may be fixedly arranged to the housing 2. The hearing device 1 comprises a suspension element 20 for suspending the microphone device 10 in the housing 2. The suspension element 20 has a first end 21 connected to the housing 2 and a second end 22 connected to the microphone device 10. The suspension element 20 and the microphone device 10, such as a mass-spring system comprising the suspension element 20 and the microphone device 10 may be configured to have a fundamental resonance frequency in the range of 0.5-10 kHz. The suspension element 20 may be hollow to allow sound waves to pass through the suspension element 20 and reach the microphone device 10, such as the membrane 13 of the microphone device 10. The suspension element 20 can thus be seen as a resilient tube. The housing 2 may comprise an opening 3 in a surface of the housing to allow soundwaves to protrude through the housing and reach the microphone device 10. The housing 2 may further comprise a spout 6, such as a sound tube, arranged around the opening 3 of the housing 2. The first end 21 of the suspension element 20 may be arranged on the spout 6 of the housing 2, such that the suspension element circumferentially surrounds the spout 6 of the housing 2. The second end 22 of the suspension element 20 may be arranged on the spout 12 of the microphone device 20, such that the suspension element circumferentially surrounds the spout 6 of the housing 2. Thereby, the suspension element 20 may seal the microphone device 10, such as the membrane 13 of the microphone device 10, from acoustic feedback signals radiated through the housing 2.

The microphone device 10 may comprise one or more electrical connectors 14 connecting the microphone device 10 to the circuit board 5. The one or more electrical connectors 14 may be made of a sheet material, having a thickness extending in the direction of the longitudinal axis X of the suspension element 20. The one or more electrical connectors 14 may thus have a higher stiffness in a direction parallel to the membrane 13 of the microphone device 10 than in a direction perpendicular to the membrane 10 of the microphone device (such as along the longitudinal axis X). By providing the electrical connectors 14 with a lower stiffness in the longitudinal direction, the electrical connectors 14 do not limit the microphone device 10 from oscillating along the longitudinal axis X. The microphone device 10 may thus be suspended in the microphone housing 2 via the suspension element 20 and the electrical connectors 14.

Figure 2:
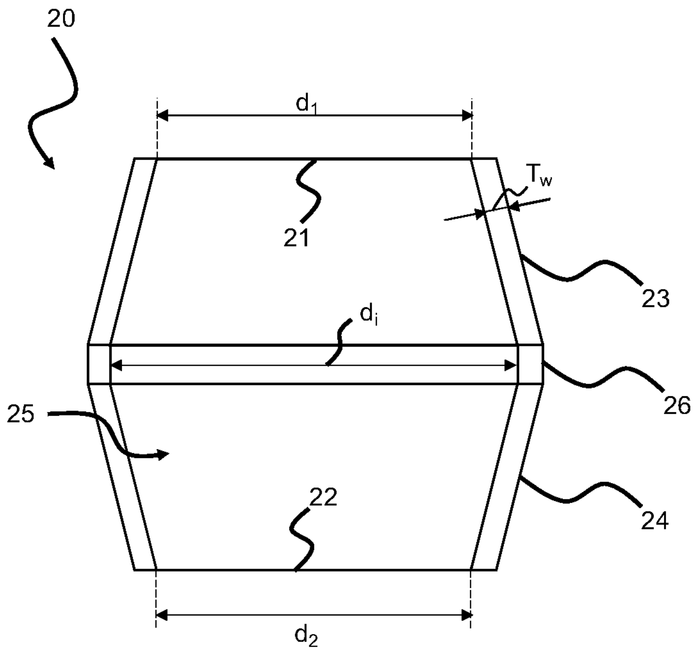

FIG. 2 shows a view of an exemplary suspension element 20 according to the current disclosure. The suspension element 20 forms a cavity 25 having a first inner diameter $d_1$ at the first end 21, a second inner diameter $d_2$ at the second end 22, and an intermediate inner diameter $d_i$ between the first inner diameter $d_1$ and the second inner diameter $d_2$. In the example suspension element 20 shown in FIG. 2, the intermediate inner diameter is larger than the first inner diameter. In one or more example hearing devices the intermediate inner diameter may be in the range of 1.1-1.4 times the first inner diameter, such as 1.2 times the first inner diameter. In other words, the suspension element 20 may thus have a tapered shape towards the first end 21. The intermediate inner diameter $d_i$ may be larger than the second inner diameter $d_2$. In one or more example hearing devices the intermediate inner diameter $d_i$ may be in the range of 1.1-1.4 times the second inner diameter $d_2$, such as 1.2 times the second inner diameter $d_2$. The suspension element 20 may thus have a tapered shape towards the second end 22. The first inner diameter $d_1$ may be equal to or different from the second inner diameter $d_2$. In one or more example methods, the first inner diameter $d_1$ is equal to the second inner diameter $d_2$ and the intermediate inner diameter $d_i$ is larger than both the first inner diameter $d_1$ and the second inner diameter $d_2$. The suspension element 20 may thus, in one or more example methods, have a double cone shape, such as being tapered towards the first end 21 and the second end 21.

In the example suspension element shown in FIG. 2, the suspension element 20 comprises a first part 23 extending from the first end 21 of the suspension element 20 to an intermediate section 26 of the suspension element 20. The first part 23 may have a continuously increasing inner diameter towards the intermediate section 26 of the suspension element 20. In one or more example methods, the first part 23 has a continuously increasing outer diameter towards the intermediate section 26 of the suspension element 20. By making the suspension element 20 wider at the intermediate section 26 than at the first end 21 and the second end 22, the suspension element 20 may collapse outwards, such as away from the centre of the suspension element 20, when the suspension element 20 is being compressed. The suspension element 20 may thus have a conical shape. By making the suspension element 20 conical the stiffness of the suspension element 20 can be adjusted to provide a fundamental resonance frequency in the range required to cancel out the acoustic feedback signal. Making the suspension element 20 conical can, in one or more example hearing devices, ensure that the suspension element 20 does not block the cavity 25 during compression, and allows sound waves to reach the membrane 13 of the microphone device 10 during compression of the suspension element 20.

In the example suspension element shown in FIG. 2, the suspension element 20 comprises a second part 24 extending from the second end 22 of the suspension element to an intermediate section 26 of the suspension element 20. The second part 24 may have a continuously increasing outer diameter towards the intermediate section 26 of the suspension element 20. In one or more example methods, the second part 24 has a continuously increasing outer diameter towards the intermediate section 26 of the suspension element 20. The suspension element 20 may have a constant wall thickness ($T_w$) between the first end 21 and the second end 22. In other words, both the inside and the outside of the first part 23 may be tapered towards the first end 21, and/or both the inside and the outside of the second part 24 may be tapered towards the second end 22.

In one or more example methods, the suspension element 20 is made of a resilient material, such as rubber, such as silicone.

Figure 3:
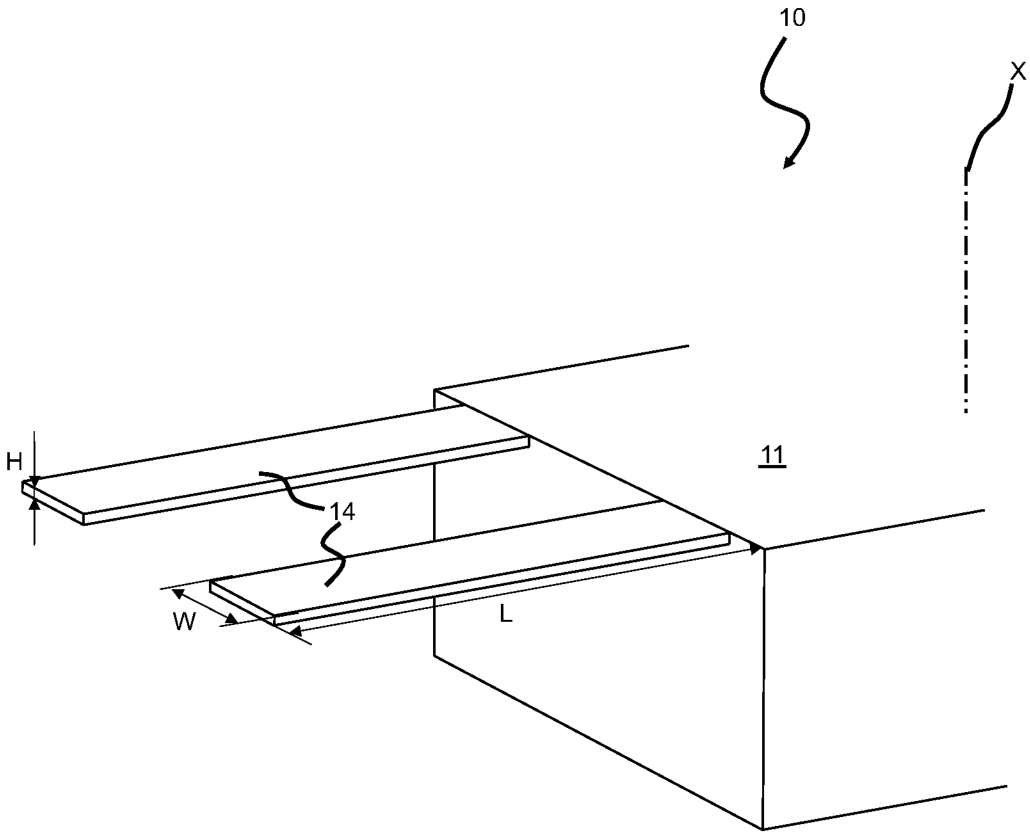

FIG. 3 shows a view of exemplary electrical connectors 14 of the microphone device 10 according to the current disclosure. In the example microphone device 10 shown in FIG. 3, the microphone device 10 comprises two electrical connectors 14 for connecting the microphone device 10 to a printed circuit board of the hearing device. In one or more example microphone devices 10, the example microphone device 10 may comprise one electrical connector 14 or more than two electrical connectors 14, such as three, four, five, or more electrical connectors 14. The electrical connectors 14 may have a higher stiffness in a direction parallel to the membrane of the microphone device 10 than in a direction perpendicular to the membrane of the microphone device 10. The direction perpendicular to the membrane of the microphone device 10 is indicated by the axis X in FIG. 3. Thereby, the electrical connectors 14 allow a movement of the microphone device 10 along the longitudinal axis X, herein also referred to as a vertical movement, which allows the microphone device 10 to swing in reversed phase to the vibrational feedback signal generated in the housing of the hearing device. During the movement of the microphone device along the longitudinal axis of the suspension element, the suspension element may be exposed to a vertical deflection, such as a deflection along the longitudinal axis X. The one or more electrical connectors 14 may be made of a sheet material, such as of a flat piece of material. A sheet material may herein be seen as a thin, flat layer of material, such as a layer of material having a thickness (H) substantially smaller than a width (W) and a length (L) of the piece of material, such as a thickness in the micrometer (μm) range compared to a width and/or a length in the millimeter (mm). In one or more example hearing devices, the electrical connectors 14 may have a length in the range of 1.8-2.0 mm, such as in the range of 1.9-2.1 mm, such as 2.0 mm. In one or more example hearing devices, the one or more electrical connectors may have a width in the range of 0.25-0.75 mm, such as in the range of 0.4-0.6 mm, such as 0.5 mm. In one or more example hearing devices, the one or more electrical connectors may have a thickness in the range of 40-50 μm, such as in the range of 42-46 μm, such as 44 μm.

Figure 4:
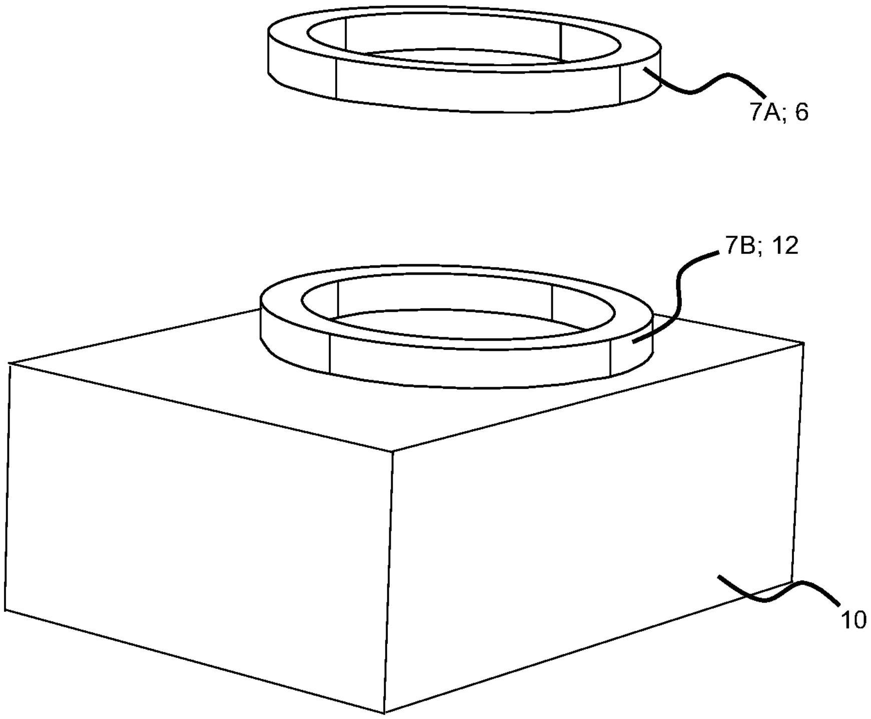

FIG. 4 shows a view of exemplary connectors for connecting the suspension element 20 to the microphone device 10 and/or the housing 2. The suspension element (not shown in FIG. 4) may be connected to the housing 2, such as to the first housing, via a first connector 7A and to the microphone device 10 via a second connector 7B. In one or more example hearing devices, the first connector 7A and/or the second connector 7B are ring shaped, such as having a circular or ovaloid cross section. The first connector 7A and/or the second connector 7B may be made of a stiffer material than the suspension element. In one or more example hearing devices, the material of the first connector and/or the second connector may have an elastic module E in the range of 450-550 MPa, such as 500 MPa, and a density Rho in the range of 1800-2200 kg/mm$^3$, such as 2000 kg/mm$^3$. In one or more example hearing devices, the first connector and/or the second connector have an inner radius in the range of 0.6-1 mm, such as 0.7-0.9 mm, such as 0.8 mm. In one or more example hearing devices, the first connector and/or the second connector have a wall thickness of 0.18-0.22 mm, such as 0.19-0.21 mm, such as 0.2 mm. The second connector 7B may be a spout on the microphone device 10, such as the spout 12 of the microphone device 10 shown in FIG. 1. The spout 12 may extend from an outer surface of the microphone device 10 towards a wall of the housing, such as of the first housing. The spout 12 may have a circular or ovaloid cross section, though the particular shape of the spout is not limiting. The first connector 7B may be a spout on the housing 2, such as the spout 6 of the housing 2 shown in FIG. 1. The spout 6 may extend from a wall of the housing, such as an inner wall of the housing, towards the microphone device 10. The spout 6 may have a circular or ovaloid cross section, though the particular shape of the spout is not limiting.

Figure 5:
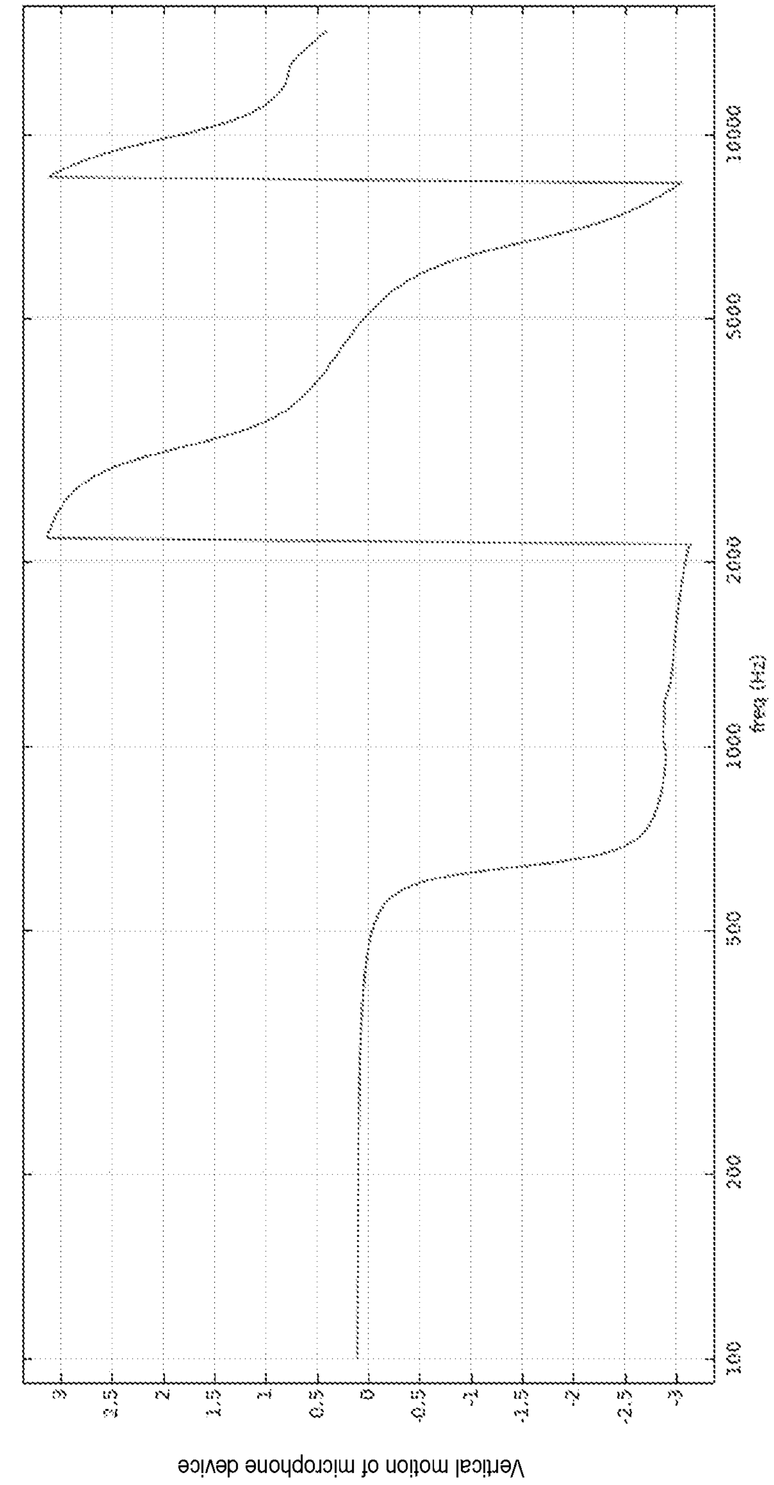
FIG. 5 shows a simulation of an average phase of an example suspended microphone device according to the disclosure.

FIG. 5 shows an average phase of a microphone device, such as of a membrane of the microphone device according to an example hearing device according to the current disclosure. In FIG. 5 a positive phase indicates that the microphone device moves in phase with the vibration of the housing while a negative phase indicates that the microphone device moves in opposite phase to the vibration of the housing. As can be seen from the example shown in FIG. 5, the phase of vertical deflection of the microphone device turns negative at around 700 Hz and stays negative until around 2200 Hz and also between 5000-8000 Hz. Hence, the example suspended microphone device shown in FIG. 5 may be out-of-phase with the vibrations of the housing of the hearing device in this frequency ranges.

The use of the terms “first”, “second”, “third” and “fourth”, “primary”, “secondary”, “tertiary” etc. does not imply any particular order, but are included to identify individual elements. Moreover, the use of the terms “first”, “second”, “third” and “fourth”, “primary”, “secondary”, “tertiary” etc. does not denote any order or importance, but rather the terms “first”, “second”, “third” and “fourth”, “primary”, “secondary”, “tertiary” etc. are used to distinguish one element from another. Note that the words “first”, “second”, “third” and “fourth”, “primary”, “secondary”, “tertiary” etc. are used here and elsewhere for labelling purposes only and are not intended to denote any specific spatial or temporal ordering.

Furthermore, the labelling of a first element does not imply the presence of a second element and vice versa.

It may be appreciated that FIGS. 1-5 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word “comprising” does not necessarily exclude the presence of other elements or steps than those listed.

It is to be noted that the words “a” or “an” preceding an element do not exclude the presence of a plurality of such elements.

It should further be noted that any reference signs do not limit the scope of the claims, that the exemplary embodiments may be implemented at least in part by means of both hardware and software, and that several “means”, “units” or “devices” may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES

1 hearing device
2 housing
3 opening
5 circuit board
6 spout of housing
7A first connector
7B second connector
10 microphone device
11 microphone housing 12 spout of microphone
13 membrane
14 electrical connector
20 suspension element
21 first end of suspension element
22 second end of suspension element
23 first part
24 second part
25 cavity
26 intermediate section
X longitudinal axis
$T_w$ wall thickness
$d_1$ first inner diameter
$d_2$ second inner diameter
$d_i$ intermediate inner diameter
H thickness
W width
L length

The invention claimed is:

1. A hearing device comprising:
- a microphone device for provision of a microphone input signal, the microphone device comprising a membrane;
- a processor configured to provide an electrical output signal based on the microphone input signal;
- a receiver configured to provide an audio output signal based on the electrical output signal;
- a printed circuit board;
- one or more housings, wherein the microphone device is in a first housing of the one or more housings; and
- a suspension element configured to suspend the microphone device in the first housing, wherein the suspension element has a first end connected to the first housing and a second end connected to the microphone device;
- wherein the suspension element is connected to the first housing via a first connector and to the microphone device via a second connector.

2. The hearing device according to claim 1, wherein the suspension element comprises a cavity, the cavity comprising a first cavity part that is closer to the first end than to the second end, and a second cavity part that is closer to the second end than to the first end, the first cavity part having a first inner diameter, the second cavity part having a second inner diameter, wherein the cavity comprises a third cavity part having an intermediate inner diameter, the third cavity part being between the first cavity part and the second cavity part, the intermediate inner diameter being larger than the first inner diameter.

3. The hearing device according to claim 2, wherein the intermediate inner diameter is larger than the second inner diameter.

4. The hearing device according to claim 1, wherein the suspension element is made of a resilient material.

5. The hearing device according to claim 4, wherein the suspension element has a constant wall thickness between the first end and the second end.

6. The hearing device according to claim 1, wherein each of the first connector and the second connector has a ring shape, and is made of a material that is stiffer than a material of the suspension element.

7. The hearing device according to claim 1, wherein the second connector is a spout on the microphone device.

8. The hearing device according to claim 1, wherein the suspension element and the microphone device have a fundamental resonance frequency that is anywhere from 0.5 kHz to 5 kHz.

9. The hearing device according to claim 1, wherein a longitudinal axis of the suspension element extends perpendicularly to the membrane of the microphone device.

10. The hearing device according to claim 1, wherein the suspension element comprises a material having a Young's modulus that is anywhere from 0.01 to 0.1 GigaPascal, GP.

11. The hearing device according to claim 1, wherein each of the first connector and the second connector is made of a material that is stiffer than a material of the suspension element.

12. The hearing device according to claim 1, wherein the microphone device comprises an electrical connector connecting the microphone device to the printed circuit board, wherein the electrical connector has a flat configuration.

13. A hearing device comprising:
- a microphone device for provision of a microphone input signal, the microphone device comprising a membrane;
- a processor configured to provide an electrical output signal based on the microphone input signal;
- a receiver configured to provide an audio output signal based on the electrical output signal;
- a printed circuit board;
- one or more housings, wherein the microphone device is in a first housing of the one or more housings; and
- a suspension element configured to suspend the microphone device in the first housing, wherein the suspension element has a first end connected to the first housing and a second end connected to the microphone device;
- wherein the suspension element comprises a first part extending from the first end of the suspension element to an intermediate section of the suspension element, wherein the first part has a continuously increasing inner diameter towards the intermediate section of the suspension element.

14. The hearing device according to claim 13, wherein the first part has a continuously increasing outer diameter towards the intermediate section of the suspension element.

15. A hearing device comprising:
- a microphone device for provision of a microphone input signal, the microphone device comprising a membrane;
- a processor configured to provide an electrical output signal based on the microphone input signal;
- a receiver configured to provide an audio output signal based on the electrical output signal;
- a printed circuit board;
- one or more housings, wherein the microphone device is in a first housing of the one or more housings; and
- a suspension element configured to suspend the microphone device in the first housing, wherein the suspension element has a first end connected to the first housing and a second end connected to the microphone device;
- wherein the suspension element comprises a part extending from the second end of the suspension element to an intermediate section of the suspension element, wherein the part of the suspension element has a continuously increasing inner diameter towards the intermediate section of the suspension element.

16. The hearing device according to claim 15, wherein the part of the suspension element has a continuously increasing outer diameter towards the intermediate section of the suspension element.

17. A hearing device comprising:
- a microphone device for provision of a microphone input signal, the microphone device comprising a membrane;

a processor configured to provide an electrical output signal based on the microphone input signal;

a receiver configured to provide an audio output signal based on the electrical output signal;

a printed circuit board;

one or more housings, wherein the microphone device is in a first housing of the one or more housings; and a suspension element configured to suspend the microphone device in the first housing, wherein the suspension element has a first end connected to the first housing and a second end connected to the microphone device;

wherein a longitudinal axis of the suspension element extends perpendicularly to the membrane of the microphone device.

18. The hearing device according to claim 17, wherein the suspension element and the microphone device have a fundamental resonance frequency that is anywhere from 0.5 kHz to 5 KHz.

19. The hearing device according to claim 17, wherein the suspension element comprises a material having a Young's modulus that is anywhere from 0.01 to 0.1 GigaPascal, GP.

20. The hearing device according to claim 17, wherein the suspension element is connected to the first housing via a first connector and to the microphone device via a second connector, and wherein each of the first connector and the second connector is made of a material that is stiffer than a material of the suspension element.

21. The hearing device according to claim 17, wherein the suspension element is connected to the first housing via a first connector and to the microphone device via a second connector, and wherein the second connector is a spout on the microphone device.

22. The hearing device according to claim 17, wherein the microphone device comprises an electrical connector connecting the microphone device to the printed circuit board, wherein the electrical connector has a flat configuration.

23. A hearing device comprising:

a microphone device for provision of a microphone input signal, the microphone device comprising a membrane;

a processor configured to provide an electrical output signal based on the microphone input signal;

a receiver configured to provide an audio output signal based on the electrical output signal;

a printed circuit board;

one or more housings, wherein the microphone device is in a first housing of the one or more housings; and a suspension element configured to suspend the microphone device in the first housing, wherein the suspension element has a first end connected to the first housing and a second end connected to the microphone device;

wherein the suspension element and the microphone device form a mass-springs system having a fundamental resonance frequency in a range of 0.7-3 kHz and/or in a range of 8-10 KHz.

24. A hearing device comprising:

a microphone device for provision of a microphone input signal, the microphone device comprising a membrane;

a processor configured to provide an electrical output signal based on the microphone input signal;

a receiver configured to provide an audio output signal based on the electrical output signal;

a printed circuit board;

one or more housings, wherein the microphone device is in a first housing of the one or more housings; and a suspension element configured to suspend the microphone device in the first housing, wherein the suspension element has a first end connected to the first housing and a second end connected to the microphone device;

wherein the suspension element comprises a material having a Young's modulus that is anywhere from 0.01 to 0.1 GigaPascal, GP.

25. A hearing device comprising:

a microphone device for provision of a microphone input signal, the microphone device comprising a membrane;

a processor configured to provide an electrical output signal based on the microphone input signal;

a receiver configured to provide an audio output signal based on the electrical output signal;

a printed circuit board;

one or more housings, wherein the microphone device is in a first housing of the one or more housings; and a suspension element configured to suspend the microphone device in the first housing, wherein the suspension element has a first end connected to the first housing and a second end connected to the microphone device;

wherein the microphone device comprises an electrical connector connecting the microphone device to the printed circuit board, wherein the electrical connector (1) has a higher stiffness in a direction parallel to the membrane of the microphone device than in a direction perpendicular to the membrane of the microphone device, and/or (2) has a flat configuration.

* * * * *